(12) United States Patent
Lin et al.

(10) Patent No.: US 6,947,801 B2
(45) Date of Patent: Sep. 20, 2005

(54) METHOD AND SYSTEM FOR SYNCHRONIZING CONTROL LIMIT AND EQUIPMENT PERFORMANCE

(75) Inventors: Shui-Tien Lin, Kinmen County (TW); Hui-Chen Chu, Hsin-Chu (TW); Hui-Wen Yang, Taichung (TW); Fu-Ching Yang, Donggang Township, Pingtung County (TW)

(73) Assignee: Taiwan Semiconductor Manufacturing Co., Ltd. (TW)

( * ) Notice: Subject to any disclaimer, the term of this patent is extended or adjusted under 35 U.S.C. 154(b) by 55 days.

(21) Appl. No.: 10/639,980

(22) Filed: Aug. 13, 2003

(65) Prior Publication Data

US 2005/0038543 A1 Feb. 17, 2005

(51) Int. Cl.$^7$ ............................................. G06F 19/00
(52) U.S. Cl. ......................... 700/108; 700/51; 700/121; 700/34
(58) Field of Search ................................. 700/108, 121, 700/51, 109, 174, 33, 34; 715/854; 702/81, 84, 182

(56) References Cited

U.S. PATENT DOCUMENTS

| | | |
|---|---|---|
| 5,010,224 A | 4/1991 | Shirey et al. |
| 5,176,751 A | 1/1993 | Findley |
| 5,257,206 A | 10/1993 | Hanson |
| 5,311,759 A | 5/1994 | Mangrulkar et al. |
| 5,339,249 A | 8/1994 | Schaeffer |
| 5,339,257 A | 8/1994 | Layden et al. |
| 5,392,226 A | 2/1995 | Hamilton |
| 5,423,199 A | 6/1995 | Mangrulkar |
| 5,442,562 A | 8/1995 | Hopkins et al. |
| 5,576,629 A | 11/1996 | Turner et al. |
| 5,586,041 A | 12/1996 | Mangrulkar |
| 5,615,474 A | 4/1997 | Kellner et al. |
| 5,656,933 A | 8/1997 | Frederickson et al. |
| 5,715,181 A | 2/1998 | Horst |
| 5,761,064 A | 6/1998 | La et al. |
| 5,841,676 A | 11/1998 | Ali et al. |
| 5,846,835 A | 12/1998 | Sisbarro et al. |
| 5,862,054 A | 1/1999 | Li |
| 5,864,483 A | 1/1999 | Brichta |
| 5,867,404 A | 2/1999 | Bryan |
| 5,907,764 A | 5/1999 | Lowell et al. |
| 5,939,886 A | 8/1999 | Turner et al. |
| 5,956,664 A | 9/1999 | Bryan |
| 5,963,783 A | 10/1999 | Lowell et al. |
| 5,987,398 A | 11/1999 | Halverson et al. |
| 5,987,979 A | 11/1999 | Bryan |
| 6,005,399 A | 12/1999 | Frederickson et al. |
| 6,067,509 A | 5/2000 | Gaiski |
| 6,090,632 A | 7/2000 | Jeon et al. |
| 6,092,275 A | 7/2000 | Kellner et al. |
| 6,153,115 A | 11/2000 | Le et al. |
| 6,155,267 A | 12/2000 | Nelson |
| 6,190,313 B1 | 2/2001 | Hinkle |
| 6,236,017 B1 | 5/2001 | Smartt et al. |
| 6,298,470 B1 | 10/2001 | Breiner et al. |
| 6,300,778 B1 | 10/2001 | Frederickson et al. |
| 6,303,395 B1 | 10/2001 | Nulman |
| 6,304,791 B1 | 10/2001 | Kim |
| 6,346,426 B1 | 2/2002 | Toprac et al. |
| 6,408,220 B1 | 6/2002 | Nulman |
| 6,473,703 B1 * | 10/2002 | Kurtzberg et al. ............ 702/84 |
| 6,556,949 B1 * | 4/2003 | Lyon .......................... 702/182 |
| 6,646,660 B1 * | 11/2003 | Patty ........................... 700/108 |
| 2004/0189719 A1 * | 9/2004 | Peng et al. .................. 345/854 |

* cited by examiner

Primary Examiner—Leo Picard
Assistant Examiner—Steven R. Garland
(74) Attorney, Agent, or Firm—Duane Morris LLP

(57) ABSTRACT

A method system for synchronizing a control chart of an SPC system and equipment performance has a chart model (22) with new chart properties; a method for calculating a control limit based on a statistical deviation, a synchronization frequency for setting a time for reviewing new data gathered by the SPC system, and a process catalog for categorizing all control charts that control the same process step, such that the control charts are organized for assignment of the same performance based control limit calculated by using statistics formed by data for control limit values of the control charts.

17 Claims, 2 Drawing Sheets

METHOD AND SYSTEM FOR SYNCHRONIZING CONTROL LIMIT AND EQUIPMENT PERFORMANCE

FIELD OF THE INVENTION

The present invention relates to a statistical process control, SPC, system, and more particularly, to a method and system having new control chart properties that synchronize a control chart and equipment performance

BACKGROUND OF THE INVENTION

U.S. Pat. No. 5,862,054 describes a process parameter monitoring system for real time process control having the capability to monitor multiple process machines, i.e., equipment, at the same time with a mix of different type of machines. The system is applicable to semiconductor wafer process machinery in a foundry fab, and is applicable to other processes and process machinery where it is necessary to for automatic collection of process parameter data for statistical process control, SPC.

Data is stored by a production control computer. The data is used to determine process control limits as well as trends in the characteristics of the process. The process control computer is connected to a company wide network through a server. Through the company wide network the process parameter monitoring system communicates with a production manufacturing system or manufacturing execution system, MES.

Each process machinery is providing key process parameter data to be applied to a real time SPC analysis. The data for each machine is accumulated separately and applied to its own SPC analysis. The data once analyzed is presented on the screen of the production control computer through a graphical users interface, GUI. There is also an alarm indicator when the process is out of control, and an accounting for the number of alarms that have occurred over the time interval of data being shown through the GUI.

The process control monitoring system can display historical data on the production control computer. This display of historical data can be important in the analysis of problems leading to poor yield. When debugging a particular process on a particular machine, the monitoring of that machine can be stopped or started without affecting the monitoring of the other process on other process machinery.

An SPC system uses control charts. For example, the use of control charts for an SPC system is disclosed in U.S. Pat. No. 5,586,041. In a factory using an SPC method for controlling complex process steps, numerous control charts are in a corresponding SPC system. For example, there are more than twenty thousand control charts in a foundry fab. Synchronizing the control limits for various charts is highly desired for obtaining optimum performance of different equipment, i.e., machines, in the foundry fab. Synchronizing control limits for various charts is an arduous task, because these charts are numerous, and are different chart types assigned to controlling different processes.

The control limits need to be verified by statistical support before assigning the control limits to be synchronized. Prior to the invention, a control limit was based on data from a single equipment. The single equipment was not always equal in performance with other equipment that have the same process capability. Thus the control limit of the single equipment could be arbitrarily assigned for the other equipment without statistical support for doing so. Further, control limits were calculated as (+/−3) Sigma of past data. The control limit assigned in this manner may be set too tight for other equipment in the foundry lab. False alarms will result, causing wasted debugging efforts. The control limit assigned in this manner may be set too loose for other equipment in the foundry fab. When the control limit is set too loose, fault detection will occur too late to avoid rework and product scrap. Thus, arbitrarily assigned control limits would not be based on statistics gathered from equipment and processes.

Prior to the invention, a method and a system was needed for synchronizing control limits of various charts for optimum equipment performance. The control limits needed to be updated with calculations based on statistics formed by new data.

SUMMARY OF THE INVENTION

Synchronization of a control chart and equipment performance is performed at a time determined by a synchronization frequency, a new control chart property, and by calculating a new control limit for the control chart based on statistics form by new data, while using a calculation method defined by a control chart property, Control Method.

An embodiment of the invention is directed to calculation of a consistent control chart property for all control charts controlling the same process step performed on different equipment. The consistent control chart property is calculated as a statistical deviation of the control chart property values of all such control charts. Then all such control charts have the same performance benchmark.

Another embodiment of the invention is directed to a chart model for all the various types of control charts for an SPC system. The chart model has new chart properties; a method for calculating a control limit based on a statistical deviation, a synchronization frequency for setting a time for reviewing new data gathered by the SPC system, and a process catalog for categorizing all control charts that control the same process step, such that the control charts are organized for assignment of the same control limit calculated as a statistical deviation of control limit values of all such control charts with the same process catalog.

DETAILED DESCRIPTION

The present invention is a method and system for synchronizing control limits for optimum equipment performance.

Figure 1:
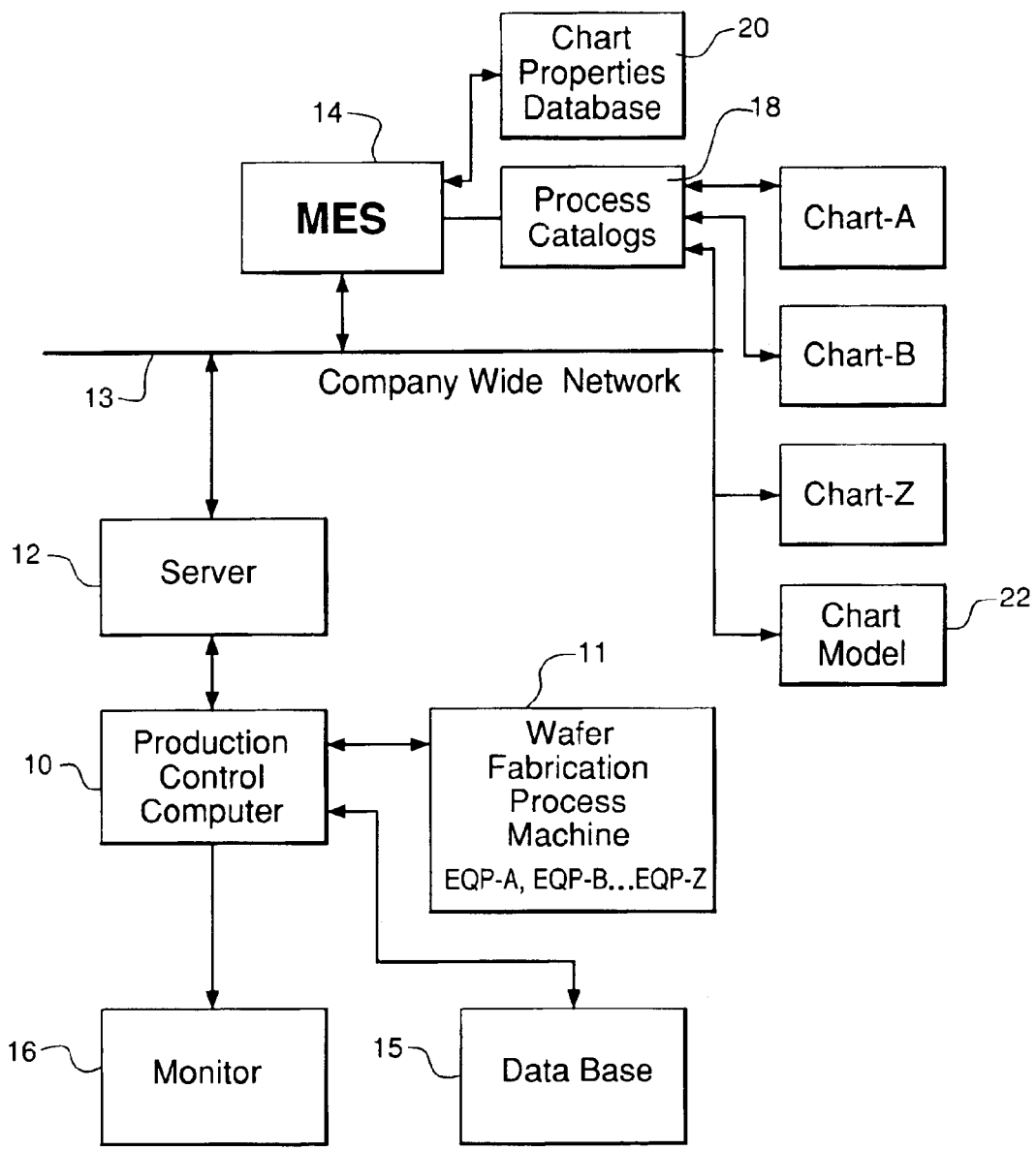
FIG. 1 is a diagram of an SPC system.
Figure 2:
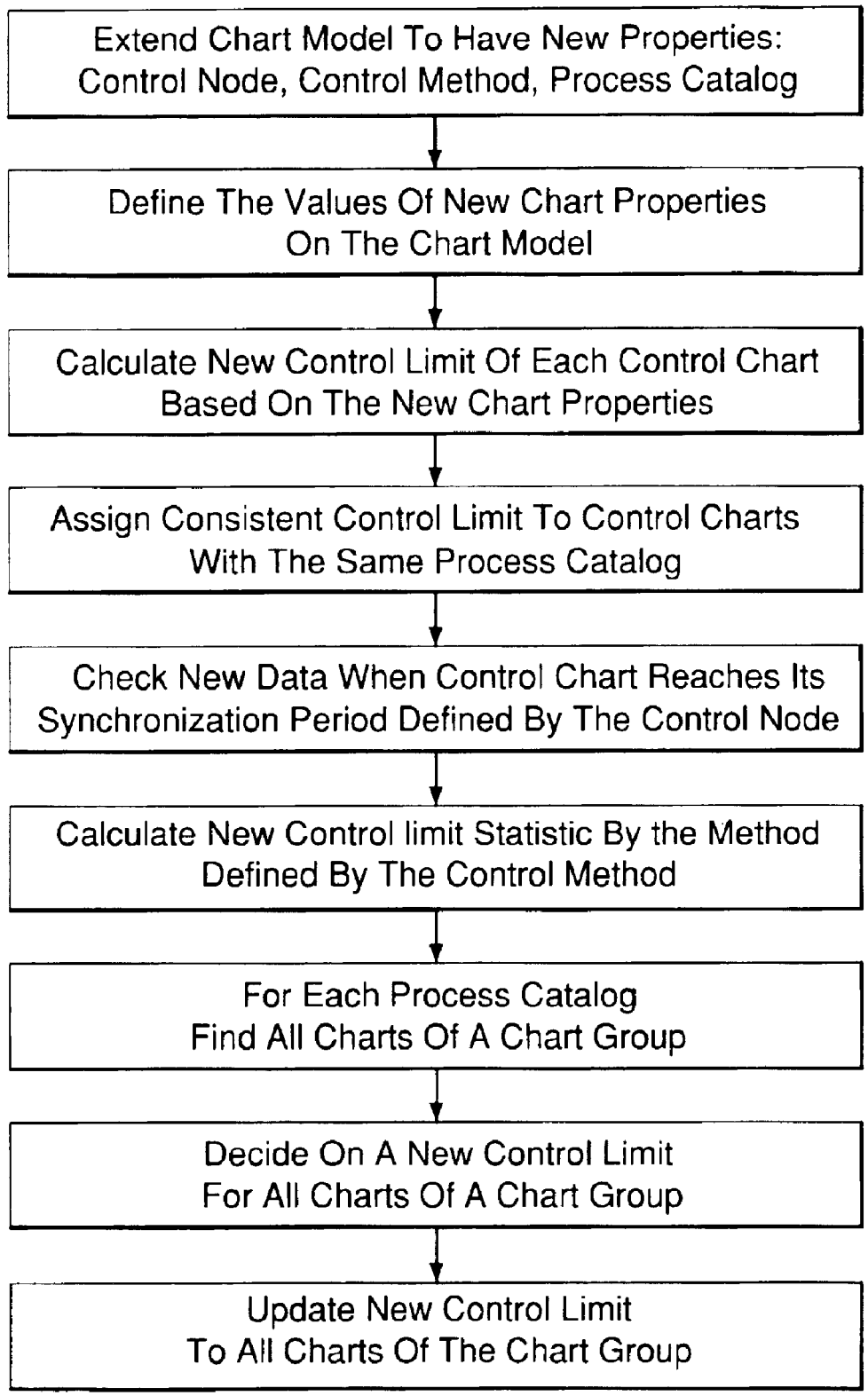
FIG. 2 is a flow chart of a process performed on the SPC system disclosed by FIG. 1.

FIG. 1 discloses a process parameter monitoring system of U.S. Pat. No. 5,862,054, for use in real time SPC. Accordingly, an SPC system is disclosed by FIG. 1. A process control computer (10) is connected to wafer fabrication machinery (11). For example, the wafer fabrication machinery (11) represents multiple process equipment, for example, EQP-A, EQP-B . . . EQP-Z. The computer (10) contains a data base (15) which is used to collect new process parameter data. The data is used to compute parameters for SPC analysis, as well as to indicate trends of the data. The computer (10) is connected by data server (12) to the company wide network from which the computer (10) has access to the manufacturing execution system, MES (14).

The computer (10) can access various data. For example, the computer (10) can access its own control charts for the machine (11) by an ID (Identification) query, to display each desired control chart and its ID with a process catalog (18) on the monitor (16). Further, the computer (10) inputs new process control parameter data gathered from operation of the equipment (11), and has access to the chart properties database (20) for the method to calculate new control limits using the new data. The process catalogs (18) categorize all control charts that control process steps that are capable of being performed by the various equipment EQP-A, EQP-B . . . EQP-Z.

In a manufacturing operation, for example, a foundry fab, from raw material to product requires performance of many process steps. Each process step requires equipment to have a specific process capability. A specific process step can be performed only by equipment that has the specific process capability. For example, a process step of, depositing 2000 Angstroms thick film oxide on a semiconductor wafer, is one process step. Each equipment EQP-A, EQP-B . . . EQP-Z has the process capability to perform the one process step. Control charts CHRT-A, CHRT-B . . . CHRT-Z control the result of the one process step capable of being performed by respective equipment EQP-A, EQP-B . . . EQP-Z. According to the invention, the multiple control charts controlling the result produced by different equipment performing the same process step are classified together with the same process catalog (18).

Each equipment may have one, or many, process step capabilities. The many process step capabilities are classified in different process catalogs (18). In a manufacturing operation, for example, a fab, there are hundreds of process catalogs (18) created to correspond with the hundreds of different process step capabilities. According to the invention, a chart model (22) for all the various types of control charts of the SPC system is extended by having one or more new chart properties described herein. A process catalog (18) is a new control chart property. All control chart properties are stored for retrieval in a chart properties database (20). A new chart model (22) for the control charts of the SPC system is extended to have a Process Catalog property.

The SPC system described by U.S. Pat. No. 5,862,054 collects process parameter data for each process batch and computes an average value for each parameter. The average values are stored as historical data that is used to determine the control limits for the various control charts of the SPC system that control the process. When the control limits are exceeded, an alarm can be activated, and the process is interrupted for debugging. The present invention avoids false alarms and late fault detection because of an ineffective control limit that has been set too tight or too loose. According to the invention, a chart model (22) for the control charts of the SPC system is extended by having one or more new chart properties. The new chart properties are based on performance benchmarks. All the control charts in the same process catalog (18) have the same performance benchmark. Thus the same performance benchmark aligns each control chart in the same process catalog (18) to the same level of process control.

A new chart model (22) for the control charts of the SPC system is extended to have a Control Node property, which is one new chart property based on a performance benchmark, synchronization frequency defined in Control Node. The synchronization frequency refers to a repeating period of time between repeated reviews or checking of each control chart. Checking each control chart involves deciding to change one or more of its performance benchmark control limits based on calculations of statistics formed by the most recent historical data, i.e., new data. In this way, the control chart is synchronized to the optimum performance of the equipment for the process step being controlled by the control chart.

Selecting a synchronization frequency will now be described. The frequency can have a wide range of values, depending on the relative importance of a control chart to aim for tight or loose control over a process result. When a control chart controls a critical process, the control chart can be synchronized every week or every day, a high frequency value. Control charts for general parameters or for wide range variation of control parameters can have a less frequent, or lower frequency value, for example, a frequency of three months. High frequency values are allocated to the control charts that require critical process control results Lower frequency values are allocated to the control charts that pertain to less critical process control results.

Further, the same performance benchmark aligns all of the control charts with the same process catalog (18) to the same level of process control. This is done by assigning a consistent control limit to each of the control charts with the same process catalog (18). According to the invention, a consistent control limit for each of these control charts is calculated as a percentile of the control limit values of all these charts. Thus a consistent control limit, in the form of a consistent synchronization frequency, is calculated as a percentile of the synchronization frequency values of the charts with the same process catalog (18)

A new chart model (22) for the control charts of the SPC system is extended to have a Control Method property. Another chart property based on a performance benchmark is a control limit based on a statistical deviation defined in Control Method. In the past, control limits for an SPC method and system have been expressed in terms of (+/−3) Sigma of past sampled data. Because control charts vary as to type, the control limits expressed in terms of (+/−3) Sigma are not well defined or well controlled for all types of control charts. For example, an equipment that has a particle count tolerance of 50 particles, performs a process with a control chart for a particle count. When a statistical distribution of the data for past particle count is stable, around a peak value of 5, and its standard deviation is 2, the upper control limit is 7, when expressed as (+/−3) Sigma. Such a control limit is set too tight. A particle count of 8 will exceed the control limit for the equipment whose particle count tolerance is 50.

According to the invention, a new control limit based on a statistical deviation of the statistical data is particularly important when an ineffective control limit of (+/−3) Sigma is too tight or too loose. For example, a control chart for the above described particle count is assigned a new control limit value of 97.5 percentile, which is based on a statistical deviation of the statistical data to set a more effective, loose control limit.

Further, the same performance benchmark aligns the control charts with the same process catalog (18) to the same level of process control. This is done by assigning a consistent control limit to each of the control charts with the same process catalog (18). According to the invention, a consistent control limit for each of these control charts is calculated as a percentile of the control limits of these charts. Thus a consistent control limit, in the form of a consistent statistical deviation value is calculated as a percentile of the statistical deviation values of the charts with the same process catalog (18).

A process according to the invention is to extend a control chart model (22) to have new properties defined in Control Node, Control Method and Process Catalog. Values are defined for the extended chart properties in Control Node, Control Method and Process Catalog.

Further, the process according to the invention is to calculate a new consistent control limit, in the form of a consistent synchronization frequency, as a statistical deviation of the values of synchronization frequencies defined in Control Node for the control charts with the same process catalog (18). Another new consistent control limit, consistent statistical deviation, is calculated as a statistical deviation of the statistical deviation values defined in Control Method for the control charts with the same process catalog (18) These consistent control limits are assigned to the corresponding charts with the same process catalog (18).

Further, after the chart properties have been extended, and the consistent control limits have been assigned, the SPC system will collect new data from the operations of the foundry fab. The new data is checked with a frequency of review determined by the consistent synchronization frequency of the control charts that control the new data. Using the new data, new statistical deviation values are calculated for each of such charts, and are respectively assigned to such charts as their new control limits. These new statistical deviation values might require a change to the consistent statistical deviation value for all charts with the same process catalog (18) Thus, All such charts are found by retrieval by the SPC system by the computer (10) and a new consistent control limit is decided, based on a percentile of all the new control limits. Thus, equipment performance and the control limit become synchronized.

A preferred embodiment of the invention has been disclosed. Other embodiments and modifications thereof are intended to be covered by the spirit and scope of the appended claims.

What is claimed is:

1. A method of synchronizing equipment performance for a statistical process control system, comprising:
    extending a chart model representation to have one or more chart properties, a control node, a control method and a process catalog;
    calculating a new consistent control limit based on statistical deviation of data defined by two or more control charts directed to the same process;
    assigning one or more consistent control limit to all control charts directed to the same process;
    selecting a synchronization frequency and updating the control charts with new control data in response to the selected synchronization frequency;
    calculating one or more new control limits based on the new control data assigning the new control limits to the control charts; and
    updating all control charts directed substantially to the same process and using at least one control chart during control of a process result.

2. The method recited in claim 1, further comprising: classifying control charts in different process catalogs corresponding to different equipment capabilities.

3. The method recited in claim 1, further comprising: setting a higher synchronization frequency as a control limit of each of the control charts controlling a critical process result.

4. The method recited in claim 1, further comprising: setting a lower synchronization frequency as a control limit of each of the control charts controlling a less critical process result.

5. The method recited in claim 1, further comprising: calculating the new control limits as a function of statistical deviation of the new control data of all charts directed substantially to the same process.

6. The method recited in claim 1, further comprising: classifying equipment capabilities for performing different processes by control charts of the different processes.

7. The method recited in claim 1, further comprising: calculating the consistent control limit applied to all control charts of a same process catalog by calculating a statistical deviation of all the control limits for such control charts.

8. The method recited in claim 1, further comprising: replacing a process standard deviation with a statistical deviation calculated as a control limit calculation method.

9. The method recited in claim 1, further comprising: providing the chart model for all of the control charts of various types.

10. A system for modeling statistical process control comprising:
    a computerized system having one or more control charts used during controlling and defining control limits of different process steps;
    a chart model representing the control charts, the chart model providing a synchronization frequency for determining a time for redefining new control limits of the control charts, and
    a Process Catalog chart property for classifying all of the control charts controlling a substantially same process step,
    a Control Method chart defining a method for calculating a consistent control limit for the control charts directed substantially to substantially the same process.

11. The system recited in claim 10, further comprising: all control charts corresponding to different equipment capabilities being classified in different processes.

12. The system recited in claim 10, wherein at least one synchronization frequency being set higher for control charts controlling critical process results.

13. The system recited in claim 10, wherein at least one synchronization frequency being set lower for control charts controlling less critical process results.

14. The system recited in claim 10, further comprising: the new control limits being calculated as a statistical deviation formed by the new data.

15. A machine-readable medium having stored thereon a plurality of machine executable instructions, the plurality of instructions comprising instructions to:
    provide a chart model representation having one or more chart properties, a control node, a control method and a process catalog;
    calculate a consistent control limit based on statistical deviation of data defined by one or more control charts directed substantially to the same process;
    assign one or more consistent control limit to all control charts directed substantially to the same process;
    select a synchronization frequency and updating the control charts with new control data;
    calculate a new control limit based on the new control data and assign the new control limits to the control charts; and
    update all control charts directed substantially to the same process.

16. The machine readable medium of claim 15, further comprising classifying at least one control chart corresponding to a process equipment in a different process catalog.

17. The machine readable medium of claim 15, wherein the plurality of instructions further comprise providing a chart model for all of the control charts of various types.

* * * * *